United States Patent [19]
Caprioli

[11] 3,719,993
[45] March 13, 1973

[54] SCRAPING APPARATUS
[76] Inventor: Daniel P. Caprioli, P.O. Box 792, Devon, Pa.
[22] Filed: April 27, 1971
[21] Appl. No.: 137,885

[52] U.S. Cl..................................30/172, 15/104.04
[51] Int. Cl................................B08b 9/02, F28g 1/08
[58] Field of Search..............30/169, 172; 15/104.04

[56] References Cited
UNITED STATES PATENTS

| 804,921 | 11/1905 | Blackburn | 15/104.04 |
|---|---|---|---|
| 1,145,966 | 7/1915 | Bergmann | 15/104.04 |
| 2,782,436 | 2/1957 | Tomer | 15/104.04 |
| 3,432,871 | 3/1969 | Caprioli | 15/104.04 |

Primary Examiner—Robert O. Riordon
Assistant Examiner—Peters, J. C.
Attorney—Howson & Howson

[57] ABSTRACT

An improved scraper is provided for removing paint, rust, scale and the like from the outer surface of elongated workpieces. The scraper comprises a pair of planar blade elements disposed in spaced relation in parallel planes transverse to the longitudinal axis of the workpiece and secured together by means of a scraper. Each blade has an edge shaped to engage substantially one-half of the periphery of the workpiece, with the edges engaging opposite sides of the workpiece for simultaneously scraping its entire surface. A handle is fastened to the spacer for applying leverage to the blade elements and for reciprocating the blade elements longitudinally of the workpiece thereby to effect the desired scraping action.

8 Claims, 5 Drawing Figures

PATENTED MAR 13 1973 3,719,993
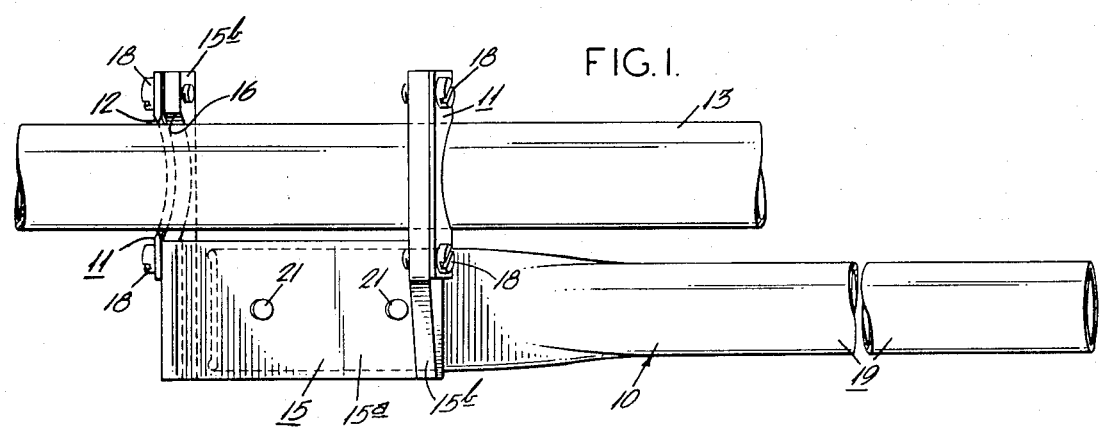
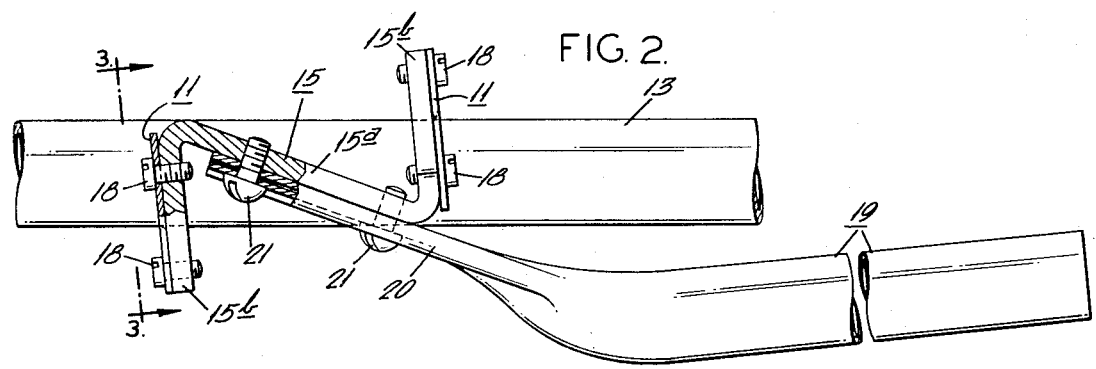
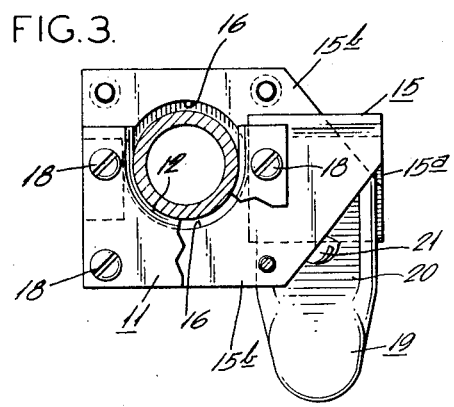
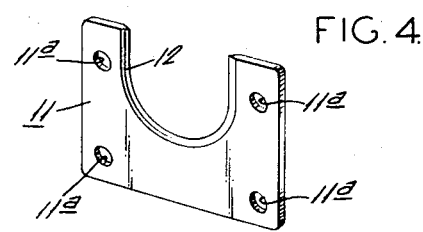
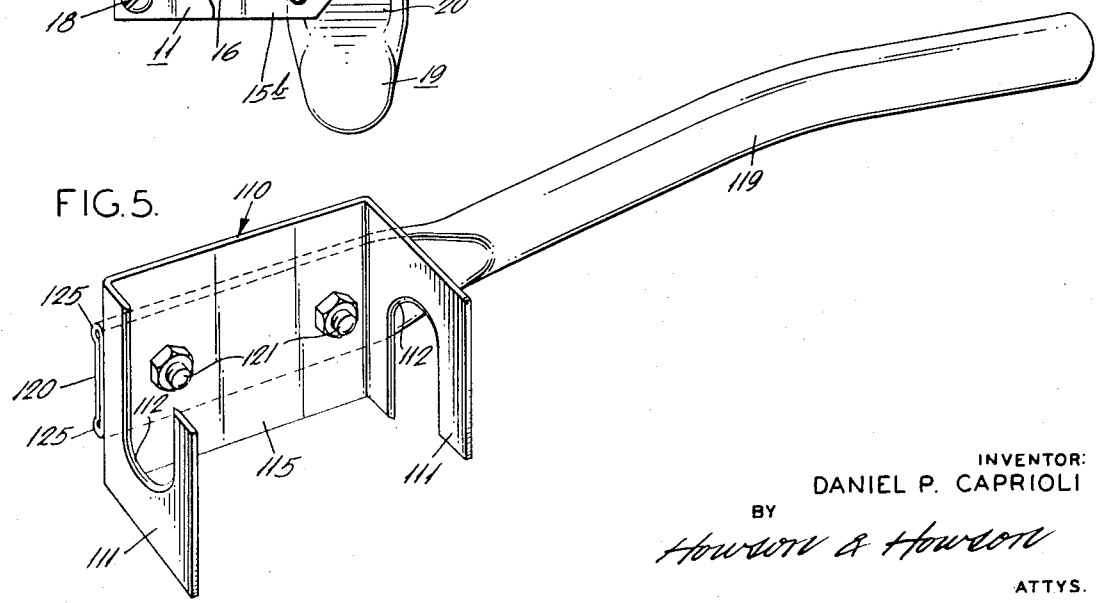
INVENTOR:
DANIEL P. CAPRIOLI
BY
Howson & Howson
ATTYS.

SCRAPING APPARATUS

The present invention relates to scrapers which are particularly suited for scraping the outer surfaces of elongated workpieces such as pipes.

Scrapers are available for removing foreign matter, including rust, old paint and the like from pipes. Examples of such scrapers are disclosed in German Pat. No. 699,624 (1940) and in U. S. Pat. Nos. 2,696,627; 1,355,574; 1,145,966; 2,169,940; 3,432,871; and 3,486,183, the last two of which issued to me. Although each of the aforementioned patented scrapers operates satisfactorily to scrape pipes, there are instances where the foreign matter firmly adheres to the surface of the workpiece and it is necessary for a workman to apply heavier scraping pressures to remove the foreign matter than can be applied by these patented scrapers. Thus, a scraper which is capable of applying heavy scraping pressures and which is relatively inexpensive to manufacture is highly desirable. Moreover, a scraper which is capable of simultaneously scraping the entire surface of a pipe during movement in one direction along the pipe and which has replaceable scraping blades is also desirable.

With the foregoing in mind, it is the primary object of the present invention to provide an improved pipe scraper which is capable of applying heavy scraping pressures to workpieces for removing a strongly adherent foreign matter.

As a further object, the present invention provides a unique pipe scraper which is of simple yet rugged construction and which is economical to manufacture.

It is another object of the present invention to provide a scraper capable of scraping simultaneously substantially the entire surface of a pipe.

It is a still further object of the present invention to provide a new pipe scraper having scraping blades which are capable of being removed and replaced should they become worn or damaged.

More specifically, the present invention provides apparatus for scraping elongated workpieces of uniform cross-section such as pipes. The apparatus comprises a pair of scraping blades each having edge means shaped to engage substantially one-half the periphery of the workpiece with the edge means engaging opposite sides of the workpiece to scrape the entire surface of the workpiece when the apparatus is displaced longitudinally thereon. Handle means is connected to the spacer means and extends longitudinally of the workpiece for applying a moment to the blades on an axis transverse to the workpiece and for reciprocating the blades relative to the workpiece. In one embodiment, the edges are provided on removable blades; in another embodiment, the edges are ground on parallel legs integral with and extending laterally outward of the spacer means.

These and other objects, features and advantages of the present invention should become apparent from the following description when taken in conjunction with the accompanying drawing in which:

FIG. 1 is a plan view of a scraper embodying the present invention, the view illustrating the scraper in scraping engagement with a pipe;

FIG. 2 is a side elevational view of the scraper illustrated in FIG. 1;

FIG. 3 is a sectional view taken along line 3—3 of FIG. 2;

FIG. 4 is a perspective view of a removable scraper blade employed in the scraper of FIGS. 1 to 3; and FIG. 5 is a perspective view of a modified embodiment of the present invention.

Referring now to the drawing, there is illustrated in FIG. 1 scraping apparatus 10 embodying the present invention. The scraper 10 comprises a pair of planar blade elements 11,11 each having edge means 12,12 ground thereon. As may be seen in FIG. 4, the edge means 12 has a semi-circular contour in the plane of the blade and is shaped to engage substantially one-half of the periphery of the workpiece 13 which, in the present instance, is a cylindrical pipe having a uniform cross-section. As illustrated in FIG. 2, the blade elements 11,11 are disposed in parallel planes, and the edge means 12,12 engage dimetrically opposite sides of the workpiece 13 at longitudinally spaced locations. It is to be noted that in this embodiment, both blades 11,11 are inclined at an acute angle with respect to a plane normal to the longitudinal axis of the workpiece 13. Thus, displacement of the apparatus 10 rightward relative to the pipe causes the edges 12,12 of the blades 11,11 to effect a scraping action on the outer surface of the pipe 13.

In order to mount the blades 11,11 in proper scraping relation, spacer means 15 is provided. As may be seen in FIG. 1, the spacer 15 has a longitudinally extending portion 15a which extends alongside the workpiece 13 and the spacer 15 has leg portions 15b,15b which extend laterally outward to define a substantially U-shaped plan configuration. As illustrated in FIG. 2, the left leg 15b extends across the underside of the pipe 13 and the right leg 15b extends across the topside of the pipe 13, and recesses 16,16 are provided in the legs 15b and 15b corresponding in shape to the edges 12,12 but spaced therefrom so as to be clear of the workpiece 13 when the edges 12,12 are in scraping engagement therewith. In elevation or profile, the spacer 15 is Z-shaped, with its longitudinally extending portion 15a being inclined with respect to the axis of pipe 13.

The blades 11,11 are mounted to the legs 15b,15b for ready removal and replacement. To this end, each blade 11 has a series of spaced bores 11a,11a and the legs 15b,15b have correspondingly spaced internally threaded bores. Threaded fasteners 18,18 engage in the threaded bores to clamp the blades 11,11 to their respective legs. With this structure, a set of blades having different edge curvatures may be provided so that by interchanging blades the scraper may be adapted to scrape a range of pipes of various diameters.

For the purpose of reciprocating the blades 11,11 longitudinally of the workpiece 13, handle means 19 is provided. As may be seen in FIGS. 1 and 2, the handle 19 has a flattened portion 20 mounted to the flat longitudinal portion 15a of the spacer 15 by means of threaded fasteners 21,21. The handle 19 extends longitudinally alongside the workpiece 13, and preferably, the handle 19 has a lengthwise dimension at least 5 times greater than the spacing between the blades 11,11. Thus, a workman may apply a leverage action to the blades 11,11 for varying the scraping pressure by displacing the handle 19 toward or away from the pipe 13 while reciprocating the apparatus relative to the pipe.

In situations where an even less expensive scraper is desired, modified scraping apparatus 110 such as illustrated in FIG. 5 is provided. The scraper 110 is similar to the aforedescribed scraper 10, having parallel legs providing scraper blades 111,111 with semi-circular edges 112,112 ground thereon. The blades 111,111 are connected together in longitudinally spaced relation by means of a spacer 115 which is integral with the blades 111,111 and which cooperates therewith to form a rigid structure having a substantially U-shaped plan configuration. Handle means 119 in the form of an elongated hollow tube is mounted to the spacer 115 and extends longitudinally thereof and hence longitudinally of the workpiece. In the illustrated embodiment, the left end of the handle 119 is flattened at 120 to form a pair of longitudinally extending beads 125,125 which are disposed in a plane normal to the axis of the applied scraping moment to increase the bending resistance of the handle adjacent its mounting location. As in the scraper 10, the handle 119 of the scraper 110 is fastened to the spacer 115 by means of threaded fasteners 121,121. With this structure, a relatively lightweight low-cost scraper which is capable of applying heavy scraping pressures to a workpiece is provided. Moreover, it is to be noted that the scraping apparatus 110 is particularly suited for low-cost mass production on punch presses and like machinery to thereby effect manufacturing economies.

In view of the foregoing, it should be apparent that there has now been provided an improved scraper which is capable of applying heavy scraping pressures to workpieces, which is capable of simultaneously scraping substantially the entire surface of the workpiece, and which is economical to fabricate.

While preferred embodiments of the present invention have been described in detail, various modifications, alterations and changes may be made without departing from the spirit and scope of the present invention as defined in the appended claims.

I claim:

1. Apparatus for scraping the outer surface of an elongated workpiece, comprising:

means providing a first scraping edge shaped to engage one side of said surface, means providing a second scraping edge spaced longitudinally of the workpiece from said first edge to engage the other side of said surface, spacer means extending between said first and second edge means to maintain said edges in said spaced relation, said spacer means having a longitudinally extending portion normally disposed alongside the workpiece when the edge means are in scraping relation therewith and having a pair of transversely extending leg portions each carrying one of said edge means, said pair of transversely extending leg portions being spaced longitudinally from one another a dimension greater than the minimum transverse dimension of said workpiece, said spacer means and leg portions cooperating to define a substantially U-shaped form open at one end for laterally receiving the workpiece, one of said legs extending across said one side of the workpiece and the other of said legs extending across said other side of the workpiece when the apparatus is in scraping relation therewith, and handle means connected to said spacer means for applying a moment to said spacer means about an axis transverse to the longitudinal axis of the workpiece to cause both said edge means to engage said surface, whereby a scraping action is effected upon reciprocation of said handle longitudinally of the workpiece.

2. Apparatus according to claim 1 including planar members providing said first and second edge means, said planar members being carried by said spacer means and being disposed in parallel planes.

3. Apparatus according to claim 2 wherein each of said parallel planes are disposed at an acute angle with respect to a plane normal to the longitudinal axis of the workpiece when both said edge means are engaged in scraping relation with said surface.

4. Apparatus according to claim 1 wherein both said edge means are removably mounted to said leg portions of said spacer means, and including threaded fastener means securing each of said edge means to its respective one of said leg portions.

5. Apparatus according to claim 1 wherein said edge means are formed on said leg portions.

6. Apparatus according to claim 5 wherein said handle means includes a tube extending longitudinally of said workpiece, said tube being flattened adjacent said spacer means to define reinforcing beads extending longitudinally of the handle, said tube being mounted to said spacer means to dispose said beads lengthwise of the workpiece and in a plane normal to the axis of the moment applied to the apparatus during scraping.

7. Apparatus according to claim 1 wherein said workpiece has a cylindrical transverse cross-section and said edge means are shaped to engage a major portion of the surface of the workpiece when in scraping relation therewith.

8. Apparatus for scraping the outer surface of an elongated workpiece, comprising: means providing a first scraping edge shaped to engage one side of said surface, means providing a second scraping edge spaced longitudinally of the workpiece from said first edge to engage the other side of said surface, spacer means extending between said first and second edge means to maintain said edges in said spaced relation, and handle means connected to said spacer means for applying a moment to said spacer means about an axis transverse to the longitudinal axis of the workpiece to cause both said edge means to engage said surface, said spacer means having a longitudinally extending portion normally disposed alongside the workpiece when the edge means are in scraping relation therewith and having a pair of transversely extending leg portions each carrying one of said edge means, said pair of transversely extending leg portions being spaced longitudinally from one another a dimension greater than the minimum transverse dimension of said workpiece, said spacer means and leg portions cooperating to define a substantially U-shaped form open at one end for laterally receiving the workpiece, one of said legs extending across said one side of the workpiece and the other of said legs extending across said other side of the workpiece when the apparatus is in scraping relation therewith, said spacer means including an element having a substantially Z-shaped profile in planes parallel to the workpiece and normal to the edge means with a flat portion extending laterally outward of the workpiece and between said leg portions for mounting said handle means, and including means to mount said handle means to said flat portion, whereby a scraping action is effected upon reciprocation of said handle longitudinally of the workpiece.

* * * * *